US012791400B2

(12) United States Patent
Liu et al.

(10) Patent No.: US 12,791,400 B2
(45) Date of Patent: Nov. 10, 2026

(54) SENSING DEVICE

(71) Applicant: TAIWAN SEMICONDUCTOR MANUFACTURING COMPANY, LTD., Hsinchu (TW)

(72) Inventors: Szu-Lin Liu, Hsinchu City (TW); Bei-Shing Lien, Taipei City (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 332 days.

(21) Appl. No.: 18/425,692

(22) Filed: Jan. 29, 2024

(65) Prior Publication Data

US 2025/0244180 A1 Jul. 31, 2025

(51) Int. Cl.
*G01K 7/16* (2006.01)

(52) U.S. Cl.
CPC .......................................... *G01K 7/16* (2013.01)

(58) Field of Classification Search
CPC ......... G01K 7/16; G01K 2219/00; G01K 7/20
See application file for complete search history.

(56) References Cited

U.S. PATENT DOCUMENTS 9,182,295 B1 * 11/2015 Perrott .................... G01K 7/22
2005/0231876 A1 * 10/2005 Komatsu ................ H01H 1/605 361/103
2013/0266041 A1 * 10/2013 Giri .......................... G01K 7/22 374/171
2017/0115725 A1 * 4/2017 Luo ....................... G06F 1/3296
2018/0262000 A1 * 9/2018 Golubovic ............. H02H 5/047
2020/0278261 A1 * 9/2020 Tang ........................ G01K 7/34
2021/0247241 A1 * 8/2021 Nagata ..................... G01K 7/20

FOREIGN PATENT DOCUMENTS

EP 3308115 B1 * 5/2022 ............ H01H 37/32
JP 2009053890 A * 3/2009
JP 2023058832 A * 4/2023
JP 7329492 B2 * 8/2023
KR 20160017514 A * 2/2016 ............... G01K 7/25
KR 20160050373 A * 5/2016 ............... G01K 7/24
KR 101890333 B1 * 8/2018 ............... G01K 7/24

* cited by examiner

*Primary Examiner* — Laura Martin Sweeney
*Assistant Examiner* — Julia Fitzpatrick
(74) *Attorney, Agent, or Firm* — Birch, Stewart, Kolasch & Birch, LLP

(57) ABSTRACT

A device includes a first resistor, a first switch, a second switch, a comparator and a counter. The first resistor is configured to sense a temperature. The first switch is coupled in series with the first resistor between a first node and a second node. The second switch is coupled in parallel with the first switch. The comparator is coupled between the first node and the second node, and generates a first clock signal when the first switch is turned on, and generates a second clock signal when the second switch is turned on. The counter generates a first digital signal according to the first clock signal, and generates a second digital signal according to the second clock signal. A value of the temperature is calculated at least according to the first digital signal and the second digital signal.

20 Claims, 12 Drawing Sheets

SENSING DEVICE

BACKGROUND

Some semiconductor devices include temperature sensors to sense temperatures of hot-spots of logic circuits in the semiconductor devices. Some temperature sensors are formed by bipolar junction transistors (BJT). However, BJT sensors are not available in substrate-less process, such as surface plasmon resonance (SPR) process, and require higher power voltage and a larger keep-out zone in logic region.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
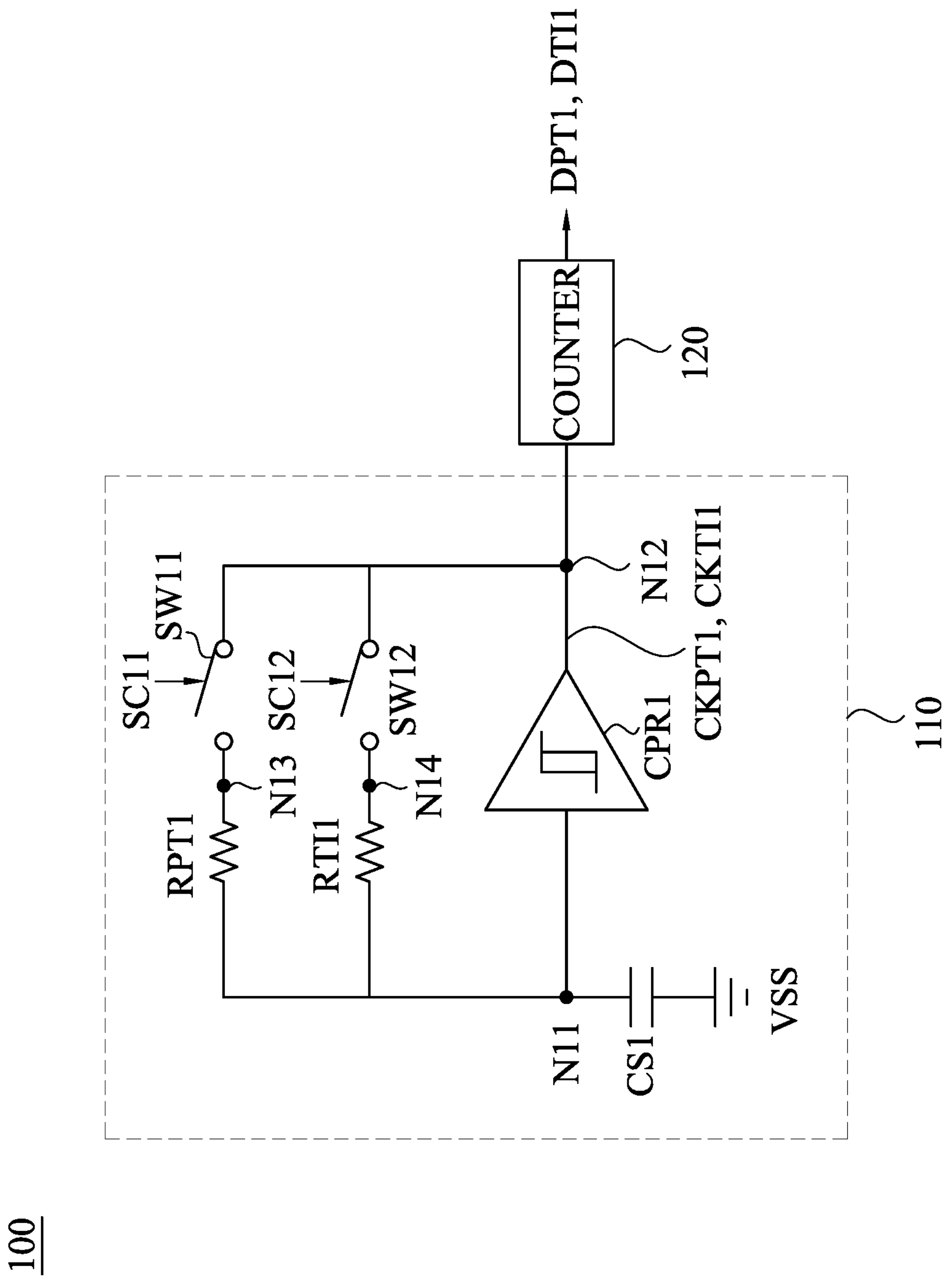
FIG. 1A is a schematic diagram of a sensing device, in accordance with some embodiments of the present disclosure.

The following disclosure provides many different embodiments, or examples, for implementing different features of the provided subject matter. Specific examples of components, materials, values, steps, arrangements or the like are described below to simplify the present disclosure. These are, of course, merely examples and are not intended to be limiting. Other components, materials, values, steps, arrangements or the like are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The device may be otherwise oriented (rotated 90 degrees or at other orientations) and the spatially relative descriptors used herein may likewise be interpreted accordingly. As used herein, "around," "about," "approximately," or "substantially" may generally mean within 20 percent, or within 10 percent, or within 5 percent of a given value or range. Numerical quantities given herein are approximate, meaning that the term "around," "about," "approximately," or "substantially" can be inferred if not expressly stated. One skilled in the art will realize, however, that the values or ranges recited throughout the description are merely examples, and may be reduced or varied with the down-scaling of the integrated circuits.

The terms applied throughout the following descriptions and claims generally have their ordinary meanings clearly established in the art or in the specific context where each term is used. Those of ordinary skill in the art will appreciate that a component or process may be referred to by different names. Numerous different embodiments detailed in this specification are illustrative only, and in no way limits the scope and spirit of the disclosure or of any exemplified term.

It is worth noting that the terms such as "first" and "second" used herein to describe various elements or processes aim to distinguish one element or process from another. However, the elements, processes and the sequences thereof should not be limited by these terms. For example, a first element could be termed as a second element, and a second element could be similarly termed as a first element without departing from the scope of the present disclosure.

In the following discussion and in the claims, the terms "comprising," "including," "containing," "having," "involving," and the like are to be understood to be open-ended, that is, to be construed as including but not limited to. As used herein, instead of being mutually exclusive, the term "and/or" includes any of the associated listed items and all combinations of one or more of the associated listed items.

Figure 2A:
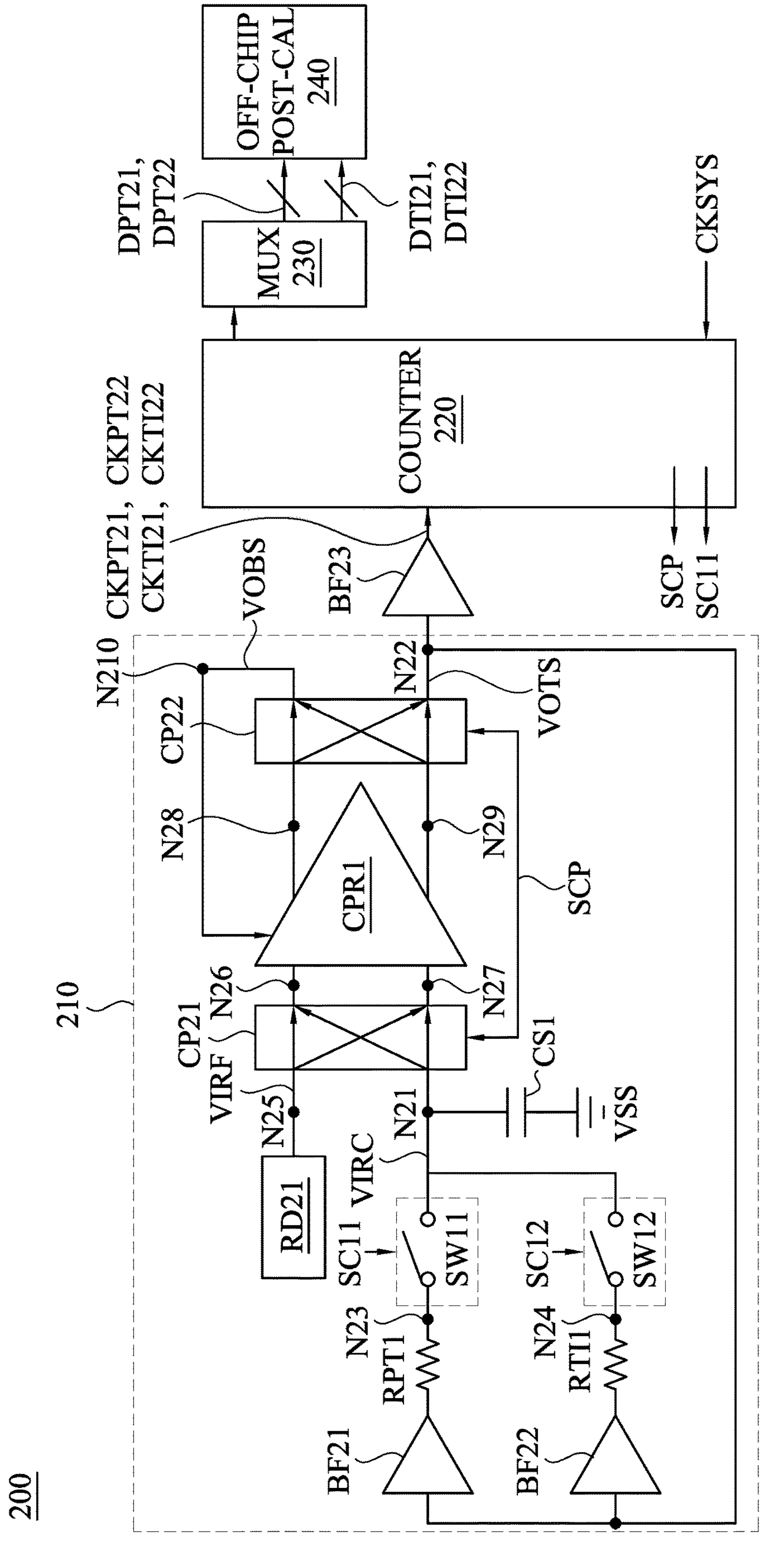
FIG. 2A is a schematic diagram of a sensing device, in accordance with some embodiments of the present disclosure.

FIG. 1A is a schematic diagram of a sensing device 100, in accordance with some embodiments of the present disclosure. As illustratively shown in FIG. 1A, the sensing device 100 includes a sensing circuit 110 and a counter 120. In some embodiments, the sensing circuit 110 is configured to sense a temperature and generate clock signals CKPT1 and CKTI1 according to the temperature. The counter 120 is configured to generate a digital signal DPT1 according to the clock signal CKPT1 and generate a digital signal DTI1 according to the clock signal CKTI1. A calculating circuit, such as the calculating circuit 240 shown in FIG. 2A, is configured to generate a value of the temperature according to the digital signals DPT1 and DTI1. Accordingly, the sensing device 100 operates as a temperature sensor.

As illustratively shown in FIG. 1A, the sensing circuit 110 includes a comparator CPR1, switches SW11, SW12, resistors RPT1, RTI1 and a capacitor CS1. A terminal of the capacitor CS1 is configured to receive a reference voltage signal VSS, and another terminal of the capacitor CS1 is coupled to a node N11. A terminal of the switch SW11 is coupled to the node N12, and another terminal of the switch SW11 is coupled to the resistor RPT1 at a node N13. A terminal of the switch SW12 is coupled to the node N12, and another terminal of the switch SW12 is coupled to the resistor RTI1 at a node N14. An input terminal of the comparator CPR1 is coupled to the node N11, and an output terminal of the comparator CPR1 is coupled to the node N12. A terminal of the resistor RPT1 is coupled to the node N13, and another terminal of the resistor RPT1 is coupled to the node N11. A terminal of the resistor RTI1 is coupled to the node N14, and another terminal of the resistor RTI1 is coupled to the node N11.

In various embodiments, the order of the switch SW12 and the resistor RTI1 are exchangeable, and the order of the switch SW12 and the resistor RTI1 are exchangeable. For example, the switch SW11 and the resistor RPT1 are coupled in order between the nodes N11 and N12 in some embodiments, and the switch SW12 and the resistor RTI1 are coupled in order between the nodes N11 and N12 in some embodiments.

In some embodiments, the switches SW11 and SW12 are controlled by control signals SC11 and SC12, respectively. The control signals SC11 and SC12 are complementary with each other. Alternatively stated, when the control signal SC11 turns on the switch SW11, the control signal SC12 turns off the switch SW12. When the control signal SC11 turns off the switch SW11, the control signal SC12 turns on the switch SW12.

In some embodiments, the resistor RTI1 is implemented by a temperature independent resistor, and the resistor RPT1 is implemented by a temperature dependent resistor. A resistance of the resistor RPT1 is increased when the temperature increased, and the resistance of the resistor RPT1 is decreased when the temperature decreased. In some embodiments, the resistance of the resistor RPT1 is proportional to the absolute temperature.

In some embodiments, when the switch SW11 is turned on, the comparator CPR1 generates the clock signal CKPT1 according to the resistance of the resistor RPT1 and the capacitance of the capacitor CS1. When the switch SW12 is turned on, the comparator CPR1 generates the clock signal CKTI1 according to the resistance of the resistor RTI1 and the capacitance of the capacitor CS1.

Specifically, in some embodiments, a period of the clock signal CKPT1 is equal to the resistance of the resistor RPT1 multiplying the capacitance of the capacitor CS1, and a period of the clock signal CKTI1 is equal to the resistance of the resistor RTI1 multiplying the capacitance of the capacitor CS1. Accordingly, the period of the clock signal CKPT1 is dependent from the temperature, and the period of the clock signal CKTI1 is independent from the temperature.

In some embodiments, the counter 120 is configured to count the clock signals CKPT1 and CKTI1, to convert the periods of the clock signals CKPT1 and CKTI1 into the digital signals DPT1 and DTI1, respectively.

In some embodiments, the value of the temperature is proportional to a value of the digital signal DPT1 divided by a value of the digital signal DTI1, which is approximately equal to the resistance of the resistor RPT1 divided by the resistance of the resistor RTI1. It is noted that the capacitance of the capacitor CS1 is cancelled.

Figure 1B:
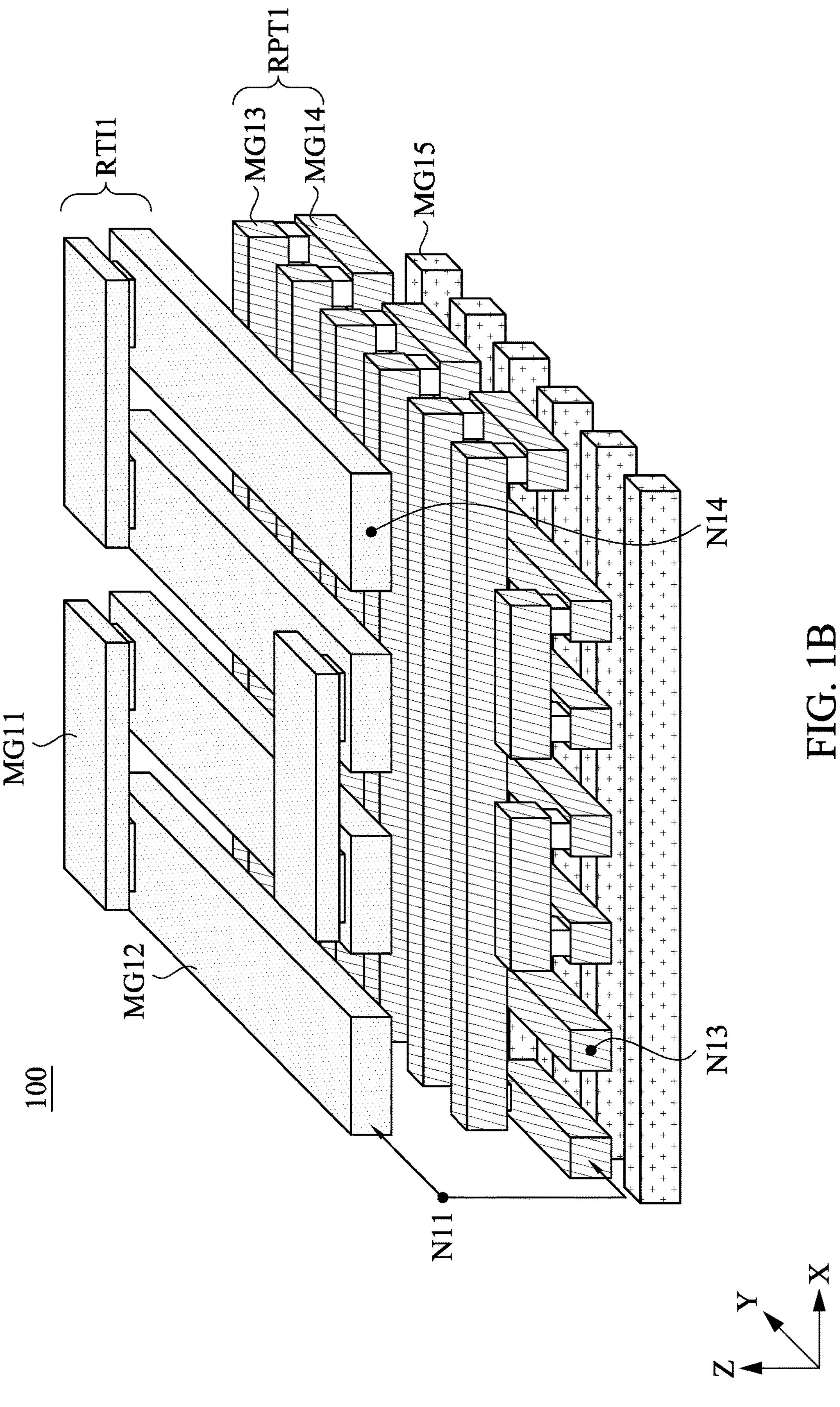
FIG. 1B is a three-dimensional structural diagram of a part of the sensing device shown in FIG. 1A, in accordance with some embodiments of the present disclosure.

FIG. 1B is a three-dimensional structural diagram of a part of the sensing device 100 shown in FIG. 1A, in accordance with some embodiments of the present disclosure. As illustratively shown in FIG. 1B, the sensing device 100 includes conductive segment groups MG11-MG15. The conductive segment groups MG11-MG15 are arranged along a Z direction in order.

In some embodiments, each of the conductive segment groups MG11-MG15 includes multiple conductive segments. The conductive segments of the conductive segment groups MG11, MG13 and MG15 extend along an X direction, and the conductive segments of the conductive segment groups MG12 and MG14 extend along a Y direction. Alternately stated, a length of each of the conductive segments of the conductive segment groups MG11, MG13 and MG15 along the X direction is longer than lengths of each of the conductive segments of the conductive segment groups MG11, MG13 and MG15 along other directions. A length of each of the conductive segments of the conductive segment groups MG12 and MG14 along the Y direction is longer than lengths of each of the conductive segments of the conductive segment groups MG12 and MG14 along other directions. In some embodiments, the X direction, the Y direction and the Z direction are perpendicular with each other.

As illustratively shown in FIG. 1B, the conductive segment group MG11 is coupled to the conductive segment group MG12 through corresponding vias. The conductive segment group MG13 is coupled to the conductive segment group MG14 through corresponding vias. The conductive segment group MG12 is separated from the conductive segment group MG13 along the Z direction. The conductive segment group MG14 is separated from the conductive segment group MG15 along the Z direction.

Referring to FIG. 1A and FIG. 1B, in some embodiments, the resistor RTI1 is implemented by the conductive segment groups MG11 and MG12, and the resistor RPT1 is implemented by the conductive segment groups MG13 and MG14. A conductive segment of the conductive segment group MG12 corresponds to the node N14. Another conductive segment of the conductive segment group MG12 is coupled to a conductive segment of the conductive segment group MG14 and corresponds to the node N11. Another conductive segment of the conductive segment group MG14 corresponds to the node N13.

Figure 1C:
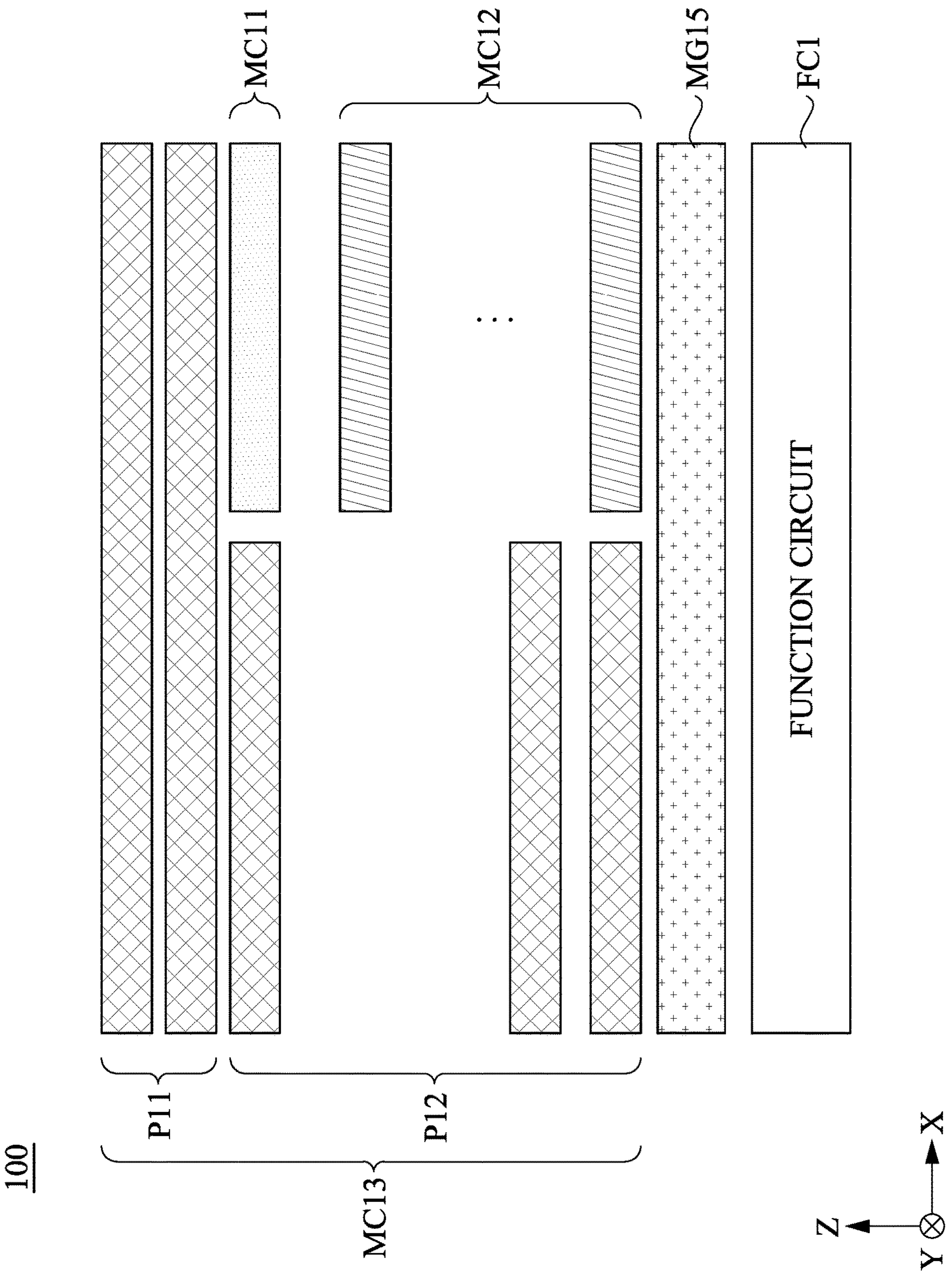
FIG. 1C is a cross sectional view diagram corresponding to the part of the sensing device shown FIG. 1B, in accordance with some embodiments of the present disclosure.

In some embodiments, the conductive segment group MG15 is implemented by shielding metal and is configured to reduce noise coupling from other circuit, such as the function circuit FC1 shown in FIG. 1C.

FIG. 1C is a cross sectional view diagram corresponding to the part of the sensing device 100 shown FIG. 1B, in accordance with some embodiments of the present disclosure. As illustratively shown in FIG. 1B, the sensing device 100 includes conductive segment groups MC11-MC13 and a function circuit FC1. Referring to FIG. 1B and FIG. 1C, the conductive segment group MC11 corresponds to the conductive segment groups MG11 and MG12, and the conductive segment group MC12 corresponds to the conductive segment groups MG13 and MG14. Therefore, some descriptions are not repeated for brevity.

As illustratively shown in FIG. 1B, the conductive segment group MC13 includes portions P11 and P12. The portion P12 and each of the conductive segment groups MC11, MC12 are arranged in order along the X direction. The portion P11 is disposed above each of the portion P12 and the conductive segment group MC11 along the Z direction. The conductive segment group MG15 is disposed between the function circuit FC1 and each of the conductive segment groups MC12 and MC13, to reduce the noise coupling of the function circuit FC1 from the conductive segment groups MC12 and MC13.

Referring to FIGS. 1A and 1C, in some embodiments, the resistor RPT1 is implemented by the conductive segment group MC12, the resistor RTI1 is implemented by the conductive segment group MC11, and the capacitor CS1 is implemented by the conductive segment group MC13.

In some embodiments, the function circuit FC1 is implemented by a logic circuit including transistors, the conductive segment group MC12 is implemented by back-end of line (BEOL) metal lines, the conductive segment group MC11 is implemented by BEOL high resistance poly, and the conductive segment group MC13 is implemented by BEOL metal-oxide-metal (MOM) capacitors.

In some approaches, a temperature sensor is implemented by temperature sensing analog circuits. A keep out zone is required between the analog circuits and digital hot-spots. Accordingly, an inaccuracy of temperature sensing is increased.

Compared to above approaches, in some embodiments of present disclosure, the RC-filter of the capacitor CS1 and resistors RTI1 and RPT1 are placed upon the logic hot-spot of the function circuit FC1 to minimize distance to heat-source. Specifically, the conductive segment groups MC11-MC13 are disposed directly above the function circuit FC1. A distance between the conductive segment groups MC11-MC13 and the function circuit FC1 is approximately equal to a height of the conductive segment group MG15 along the Z direction. Accordingly, the capacitor CS1 and resistors RTI1 and RPT1 are placed close to the function circuit FC1, and the inaccuracy of temperature sensing is decreased.

FIG. 2A is a schematic diagram of a sensing device 200, in accordance with some embodiments of the present disclosure. Referring to FIG. 2A and FIG. 1A, the sensing device 200 is an alternative embodiment of the sensing device 100. FIG. 2A follows a similar labeling convention to that of FIG. 1A. For brevity, the discussion will focus more on differences between FIG. 2A and FIG. 1A than on similarities.

As illustratively shown in FIG. 2A, the sensing device 200 includes a sensing circuit 210, a buffer BF23, a counter 220, a multiplexer (MUX) 230 and a calculating circuit 240. In some embodiments, the sensing circuit 210 is configured to sense the temperature to generate a voltage signal VOTS at a node N22. The buffer BF23 is configured to generate clock signals CKPT21, CKPT22, CKTI21 and CKTI22 according to the at least one voltage signal at the node N22. Alternatively stated, the buffer BF23 is configured to output the voltage signal VOTS as the clock signals CKPT21, CKPT22, CKTI21 and CKTI22.

In some embodiments, the counter 220 is configured to count the periods of the clock signals CKPT21, CKPT22, CKTI21 and CKTI22 by a clock signal CKSYS to generate corresponding digital signals DPT21, DPT22, DTI21 and DTI22. In some embodiments, a period of the clock signal CKSYS is shorter than each of the periods of the clock signals CKPT21, CKPT22, CKTI21 and CKTI22. Alternatively stated, the clock signal CKSYS is faster than each of the clock signals CKPT21, CKPT22, CKTI21 and CKTI22. In some embodiments, the clock signal CKSYS is referred to as a system clock signal.

In some embodiments, the counter 220 is further configured to generate control signals SCP and SC11. The multiplexer 230 is configured to transmit the digital signals DPT21, DPT22, DTI21 and DTI22 according to the control signal SC11. The calculating circuit 240 is configured to calculate the value of the temperature according to the digital signals DPT21, DPT22, DTI21 and DTI22.

As illustratively shown in FIG. 2A, the sensing circuit 210 includes the comparator CPR1, the switches SW11, SW12, the resistors RPT1, RTI1, the capacitor CS1, the buffers BF21, BF22, chop circuits CP21, CP22 and a voltage divider RD21. A terminal of the capacitor CS1 is coupled to a node N21, and another terminal of the capacitor CS1 is configured to receive the reference voltage signal VSS. The switch SW11 is coupled between nodes N21 and N23. The switch SW12 is coupled between nodes N21 and N24. The resistor RPT1 is coupled between the node N23 and an output terminal of the buffer BF21. The resistor RTI1 is coupled between the node N24 and an output terminal of the buffer BF22. Each of input terminals of the buffers BF21 and BF22 is coupled to the node N22. The sensing circuit 210 is configured to generate voltage signals VIRC and VOTS at the nodes N21 and N22, respectively, according to the resistance-capacitance (RC) of the sensing circuit 210.

Referring to FIG. 1A and FIG. 2A, the nodes N21 and N22 correspond to the nodes N11 and N12, respectively. Accordingly, the sensing circuit 110 is also configured to generate the voltage signals VIRC and VOTS at the nodes N11 and N12, respectively, according to the resistance-capacitance of the sensing circuit 110. The clock signal CKPT1 corresponds to the clock signals CKPT21 and CKPT22. The clock signal CKTI1 corresponds to the clock signals CKTI21 and CKTI22. Referring to FIG. 1B and FIG. 2A, the conductive segments corresponding to the node N11 is configured to receive the voltage signal VIRC in some embodiments.

As illustratively shown in FIG. 2A, two input terminals of the chop circuit CP21 are coupled to nodes N21 and N25, respectively. Two output terminals of the chop circuit CP21 are coupled to nodes N26 and N27, respectively. Two input terminals of the comparator CPR1 are coupled to the nodes N26 and N27, respectively. Two output terminals of the comparator CPR1 are coupled to nodes N28 and N29, respectively. Two input terminals of the chop circuit CP22 are coupled to the nodes N28 and N29, respectively. An output terminal of the chop circuit CP22 is coupled to the node N22, and another output terminal of the chop circuit CP22 is coupled a node N210 associated with a power terminal of the comparator CPR1.

In some embodiments, the voltage divider RD21 is configured to generate a voltage signal VIRF at the node N25. The chop circuit CP22 is configured to generate voltage signals VOTS and VOBS at the nodes N22 and N210, respectively. The chop circuit CP21 is configured to transmit the voltage signals VIRF and VIRC to the nodes N26 and N27 according to the control signal SCP.

For example, when the control signal SCP has a first voltage level, the chop circuit CP21 couples the node N25 to the node N26, to transmit the voltage signal VIRF to the node N26, and couples the node N21 to the node N27, to transmit transmits the voltage signal VIRC to the node N27. When the control signal SCP has a second voltage level different from the first voltage level, the chop circuit CP21 couples the node N25 to the node N27, to transmit the voltage signal VIRF to the node N27, and couples the node N21 to the node N26, to transmit the voltage signal VIRC to the node N26.

Similarly, the chop circuit CP22 is configured to couple the nodes N28 and N29 to the nodes N22 and N210 according to the control signal SCP. For example, when the control signal SCP has the first voltage level, the chop circuit CP22 couples the node N28 to the node N210, and couples the node N29 to the node N22. When the control signal SCP has the second voltage level, the chop circuit CP22 couples the node N28 to the node N22, and couples the node N29 to the node N210.

Alternatively stated, when the control signal SCP has the first voltage level, the chop circuit CP22 outputs a voltage signal at the node N28 as the voltage signal VOBS, and outputs a voltage signal at the node N29 as the voltage signal VOTS. When the control signal SCP has the second voltage level, the chop circuit CP22 outputs the voltage signal at the node N29 as the voltage signal VOBS, and outputs the voltage signal at the node N28 as the voltage signal VOTS. In some embodiments, different operations of the chop circuits CP21 and CP22 corresponding to the different voltage level of the control signal SCP cancel input mismatch of the comparator CPR1.

In some embodiments, the voltage signal VIRF is referred to as a reference voltage signal. The voltage signal VOBS is referred to as a bias voltage signal. The comparator CPR1 is biased by the voltage signal VOBS. Accordingly, the comparator CPR1 is referred to as a self-bias comparator.

In some embodiments, the sensing circuit 210 is configured to operate in four phases to generate the clock signals CKPT21, CKPT22, CKTI21 and CKTI22, respectively. During the first phase, the switch SW11 is turned on and the control signal has the first voltage level to generate the clock signal CKPT21. During the second phase, the switch SW11 is turned on and the control signal has the second voltage level to generate the clock signal CKPT22. During the third phase, the switch SW12 is turned on and the control signal has the first voltage level to generate the clock signal CKTI21. During the third phase, the switch SW12 is turned on and the control signal has the second voltage level to generate the clock signal CKTI22. The clock signals CKPT21 and CKPT22 are generated according to the resistor RPT1 and are dependent from the temperature.

In some embodiments, the phase of the sensing circuit 210 is controlled by the counter 220 by adjusting the control signals SCP and SC11. For example, during the first phase, the counter 220 generates the digital signal DPT21 according to the clock signal CKPT21. After the digital signal DPT21 is generated, the counter changes the voltage level of the control signal SCP, to switch to the second phase.

During the second phase, the counter 220 generates the digital signal DPT22 according to the clock signal CKPT22. After the digital signal DPT22 is generated, the counter changes the voltage levels of the control signals SCP and SC11, to switch to the third phase. During the third phase, the counter 220 generates the digital signal DTI21 according to the clock signal CKTI21. After the digital signal DTI21 is generated, the counter changes the voltage level of the control signal SCP, to switch to the fourth phase. During the fourth phase, the counter 220 generates the digital signal DTI22 according to the clock signal CKTI22.

In some embodiments, the multiplexer 230 transmits the digital signals DPT21 and DPT22 when the switch SW11 is turned on according to the control signal SC11, and transmits the digital signals DTI21 and DTI22 when the switch SW11 is turned off according to the control signal SC11.

In some embodiments, the calculating circuit 240 is configured to sum values of the digital signals DPT21 and DPT22 to generate a first summation and sum values of the digital signals DTI21 and DTI22 to generate a second summation. The calculating circuit 240 is further configured to divide the first summation by the second summation to generate the value of the temperature. It is noted that the first summation divided by the second summation is approximately equal to the resistance of the resistor RPT1 divided by the resistance of the resistor RTI1, and is proportional to the value of the temperature. In some embodiments, the calculating circuit 240 is implemented by an off-chip post-calculation circuit.

Figure 2B:
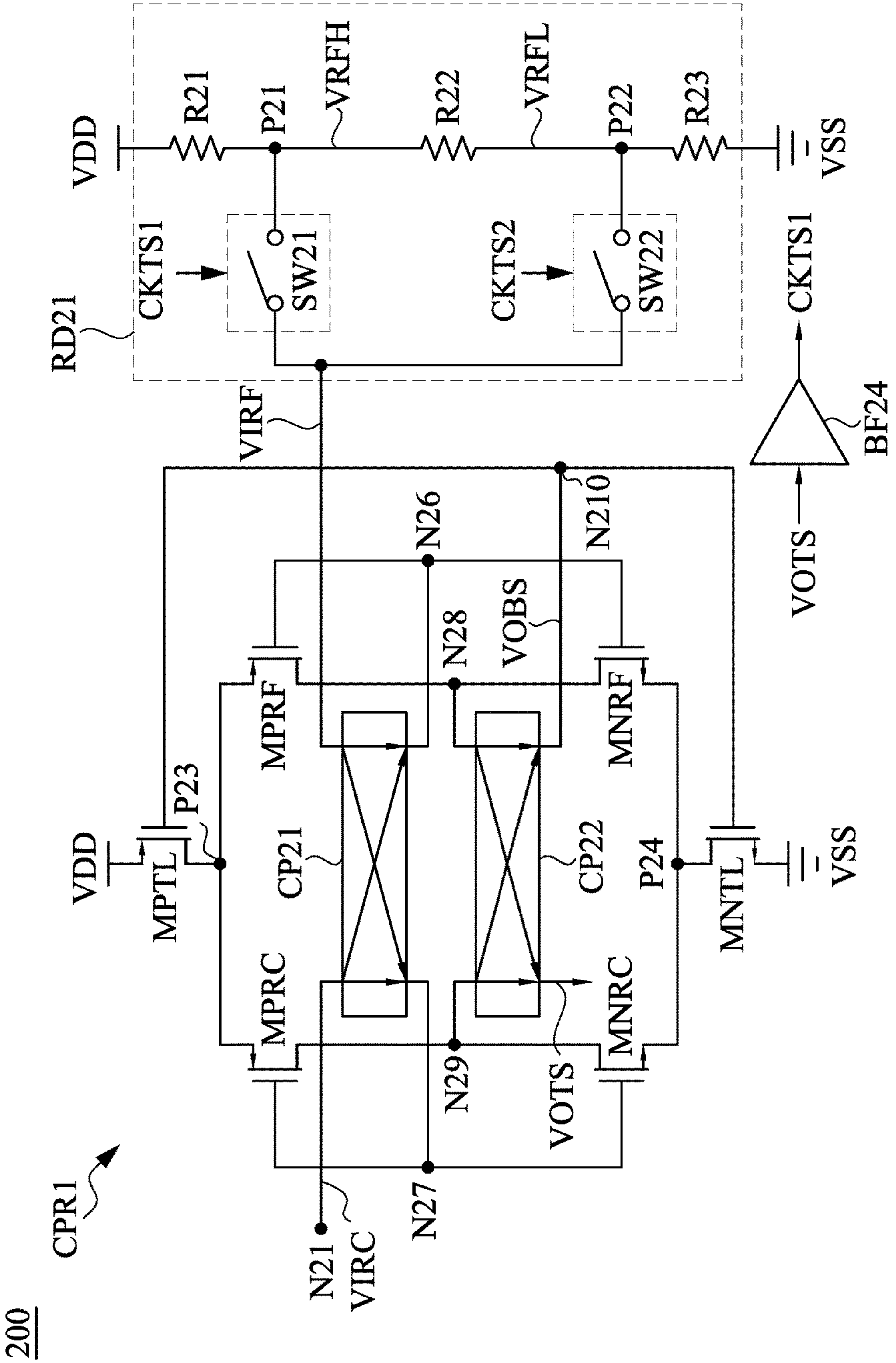
FIG. 2B is a schematic diagram of further details of a part of the sensing device shown in FIG. 2A, in accordance with some embodiments of the present disclosure.

FIG. 2B is a schematic diagram of further details of a part of the sensing device 200 shown in FIG. 2A, in accordance with some embodiments of the present disclosure. As illustratively shown in FIG. 2A, the voltage divider RD21 includes resistors R21-R23 and switches SW21-SW22. A terminal of the resistor R21 is coupled to a node P21, and another terminal of the resistor R21 is configured to receive a reference voltage signal VDD. A terminal of the resistor R23 is coupled to a node P22, and another terminal of the resistor R23 is configured to receive the reference voltage signal VSS. The resistor R22 is coupled between the nodes P21 and P22. The switch SW21 is coupled between the nodes N25 and P21. The switch SW22 is coupled between the nodes N25 and P22.

In some embodiments, the sensing device 200 further includes a buffer BF24. The buffer BF24 is configured to generate a clock signal CKTS1 according to the voltage signal VOTS. Referring to FIG. 2A and FIG. 2B, the clock signal CKTS1 is a collective name of the clock signals CKPT21, CKPT22, CKTI21 and CKTI22. In some embodiments, the buffer BF24 is implemented by the buffer BF23.

As illustratively shown in FIG. 2A, the switches SW21 and SW22 are controlled by clock signals CKTS1 and CKTS2, respectively. The clock signals CKTS1 and CKTS2 are complementary with each other. Specifically, when the switch SW21 is turned on according to the clock signal CKTS1, the switch SW22 is turned off according to the clock signal CKTS2. When the switch SW21 is turned off according to the clock signal CKTS1, the switch SW22 is turned on according to the clock signal CKTS2. Alternatively stated, a control terminal of the switch SW21 is configured to receive the clock signals CKPT21, CKPT22, CKTI21 and CKTI22, and control terminal of the switch SW22 is configured to receive inverted versions of the clock signals CKPT21, CKPT22, CKTI21 and CKTI22.

In some embodiments, the voltage divider RD21 is configured to generate reference voltage signals VRFH and VRFL at the nodes P21 and P22, respectively. When the switch SW21 is turned on, the voltage divider RD21 generates the voltage signal VIRF according to the reference voltage signal VRFH. When the switch SW22 is turned on, the voltage divider RD21 generates the voltage signal VIRF according to the reference voltage signal VRFL.

As illustratively shown in FIG. 2A, the comparator CPR1 includes switches MPRF, MNRF, MPTL, MNTL, MPRC and MNRC. A terminal of the switch MPTL is configured to receive the reference voltage signal VDD, another terminal of the switch MPTL is coupled to a node P23, and a control terminal of the switch MPTL is configured to receive the voltage signal VOBS at the node N210. A terminal of the switch MNTL is configured to receive the reference voltage signal VSS, another terminal of the switch MNTL is coupled to a node P24, and a control terminal of the switch MNTL is configured to receive the voltage signal VOBS at the node N210.

As illustratively shown in FIG. 2A, a terminal of the switch MPRC is coupled to the node P23, another terminal of the switch MPRC is coupled to the node N29, and a control terminal of the switch MPRC is coupled to the node N27. A terminal of the switch MNRC is coupled to the node P24, another terminal of the switch MNRC is coupled to the node N29, and a control terminal of the switch MNRC is coupled to the node N27.

Similarly, a terminal of the switch MPRF is coupled to the node P23, another terminal of the switch MPRF is coupled to the node N28, and a control terminal of the switch MPRF is coupled to the node N26. A terminal of the switch MNRF is coupled to the node P24, another terminal of the switch MNRF is coupled to the node N28, and a control terminal of the switch MNRF is coupled to the node N26.

In some embodiments, a conductive type of the switches MPTL, MPRC and MPRF is different from a conductive type of the switches MNTL, MNRC and MNRF. For example, in response to a voltage level of the reference voltage signals VDD or VRFH, the switches MPTL, MPRC and MPRF are turned off and the switches MNTL, MNRC and MNRF are turned on. In response to a voltage level of the reference voltage signals VSS or VRFL, the switches MPTL, MPRC and MPRF are turned on and the switches MNTL, MNRC and MNRF are turned off. In some embodiments, the switches MPTL, MPRC and MPRF are implemented by P-type metal-oxide-semiconductor (MOS) transistors, and the switches MNTL, MNRC and MNRF are implemented by N-type MOS transistors.

Figure 3:
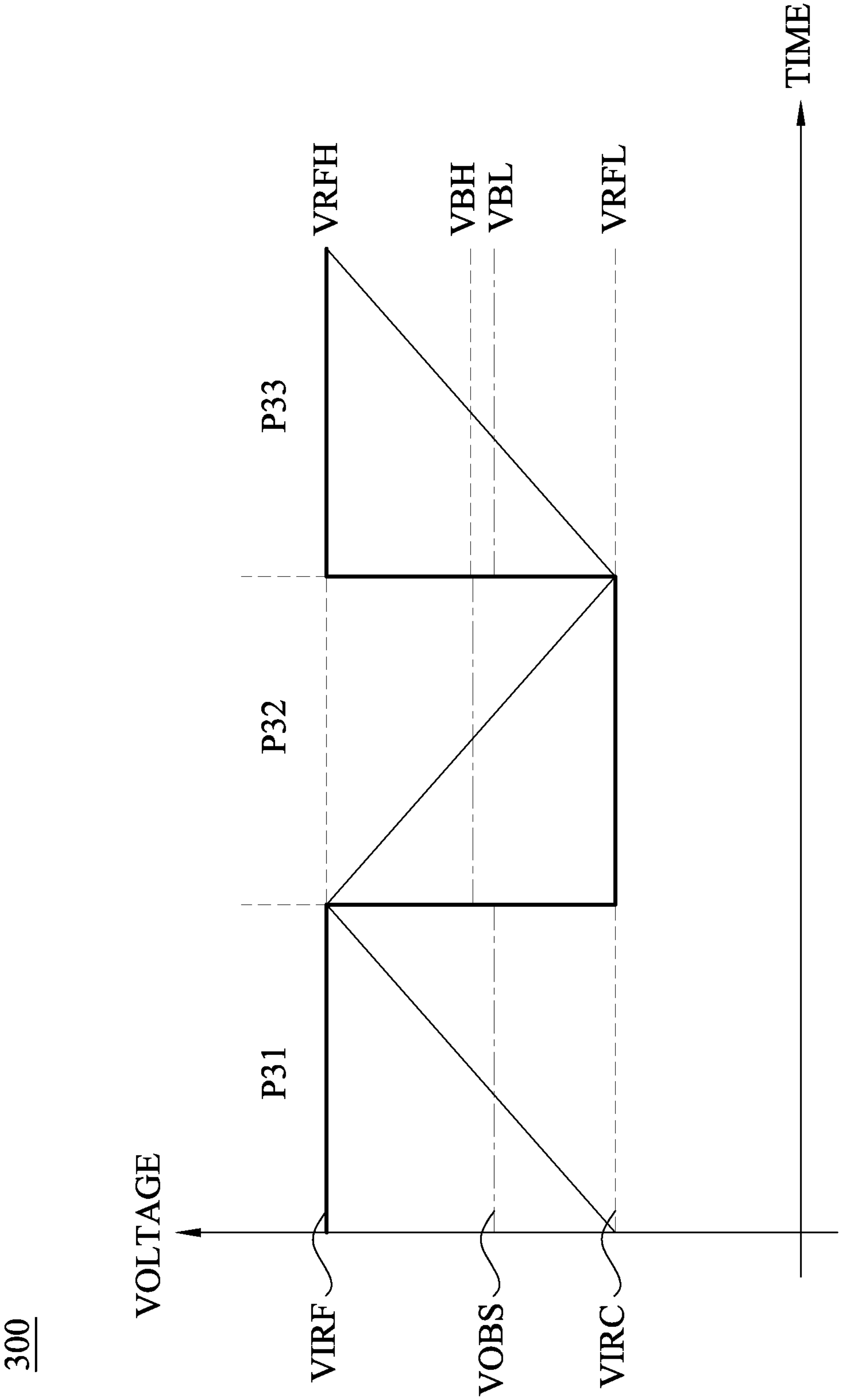
FIG. 3 is a timing diagram of the sensing device shown in FIG. 2B, in accordance with some embodiments of the present disclosure.

FIG. 3 is a timing diagram 300 of the sensing device 200 shown in FIG. 2B, in accordance with some embodiments of the present disclosure. As illustratively shown in FIG. 3, the timing diagram 300 includes periods P31-P33 arranged continuously in order.

During the period P31, the switch SW21 is turned on, such that the voltage signal VIRF has the voltage level of the reference voltage signal VRFH. Accordingly, the switch MNRF is turned on to discharge the voltage signal VOBS, such that the voltage signal VOBS has a voltage level VBL. At this moment, the voltage signal VIRC is charged gradually from the voltage level of the reference voltage signal VRFL to the voltage level of the reference voltage signal VRFH.

During the period P32, the switch SW22 is turned on, such that the voltage signal VIRF has the voltage level of the reference voltage signal VRFL. Accordingly, the switch MPRF is turned on to discharge the voltage signal VOBS, such that the voltage signal VOBS has a voltage level VBH larger than the voltage level VBL. At this moment, the voltage signal VIRC is discharged gradually from the voltage level of the reference voltage signal VRFH to the voltage level of the reference voltage signal VRFL.

During the period P33, the switch SW21 is turned on, such that the voltage signal VIRF has the voltage level of the reference voltage signal VRFH. Accordingly, the switch MNRF is turned on to discharge the voltage signal VOBS, such that the voltage signal VOBS has the voltage level VBL. At this moment, the voltage signal VIRC is charged gradually from the voltage level of the reference voltage signal VRFL to the voltage level of the reference voltage signal VRFH.

Figure 4:
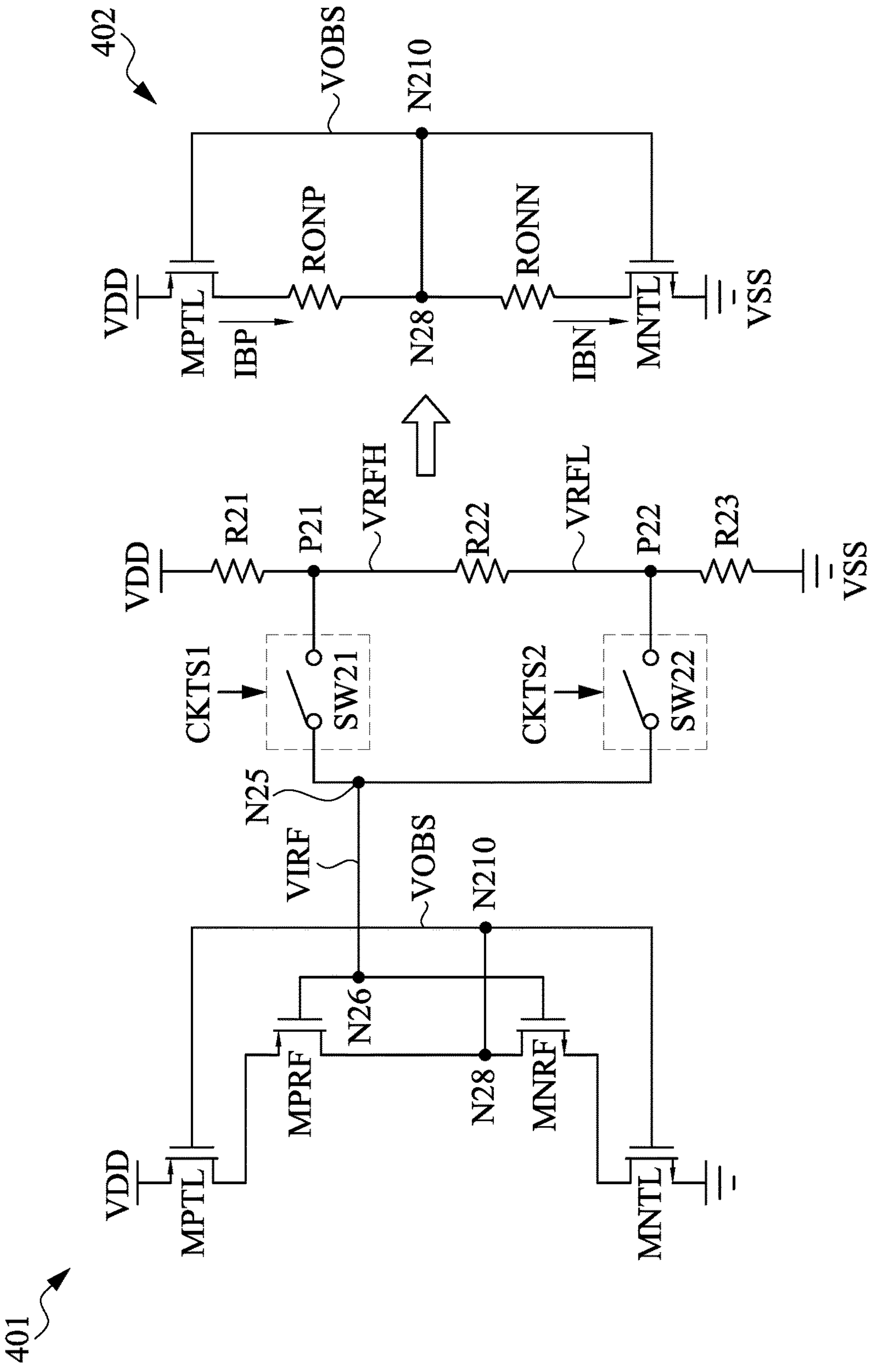
FIG. 4 is a schematic diagram of a part of the sensing device shown in FIG. 2B, in accordance with some embodiments of the present disclosure.

FIG. 4 is a schematic diagram of a part 401 of the sensing device 200 shown in FIG. 2B, in accordance with some embodiments of the present disclosure. Referring to FIG. 2B and FIG. 4, the part 401 includes the switches MPTL, MNTL, MPRF, MNRF and the voltage divider RD21. In the embodiment shown in FIG. 4, the chop circuit CP21 couples the node N25 to the node N26, and the chop circuit CP22 couples the node N28 to the node N210.

As illustratively shown in FIG. 4, the circuit 402 is an equivalent circuit of the part 401. The resistor RONP is an equivalent resistor of the switch MPRF when the switch MPRF is turned on. The resistor RONN is an equivalent resistor of the switch MNRF when the switch MNRF is turned on.

In some embodiments, when the switch MPRF is turned on, the switch MPTL and the resistor RONP generate a current signal IBP to adjust the voltage signal VOBS. When the switch MNRF is turned on, the switch MNTL and the resistor RONN generate a current signal IBN to adjust the voltage signal VOBS. Accordingly, the comparator CPR1 is self-biased by the current signals IBP and IBN. In some embodiments, the current signals IBP and IBN are referred to as bias currents.

In some approaches, in a temperature sensor, bias currents are generated by accurate analog current-mirror. An operation amplifier is required to proceed continuous-time comparison. As a result, the cost of the temperature sensor is high.

Compared to above approaches, in some embodiments of present disclosure, the comparator CPR1 is self-biased by the voltage signal VIRF, such that the accurate analog current-mirror is not required. During periods P31-P33, the voltage signal VIRC is charged and discharged with the reference voltage signals VRFH and VRFL, and the states are auto-changed, such that the operation amplifier is not required. As a result, the cost of the sensing device 200 is reduced. Furthermore, because the reference voltage signals VRFH and VRFL are ratio-metric division from the reference voltage signal VDD, the period of the voltage signal VIRC is independent to the reference voltage signal VDD.

Figure 5:
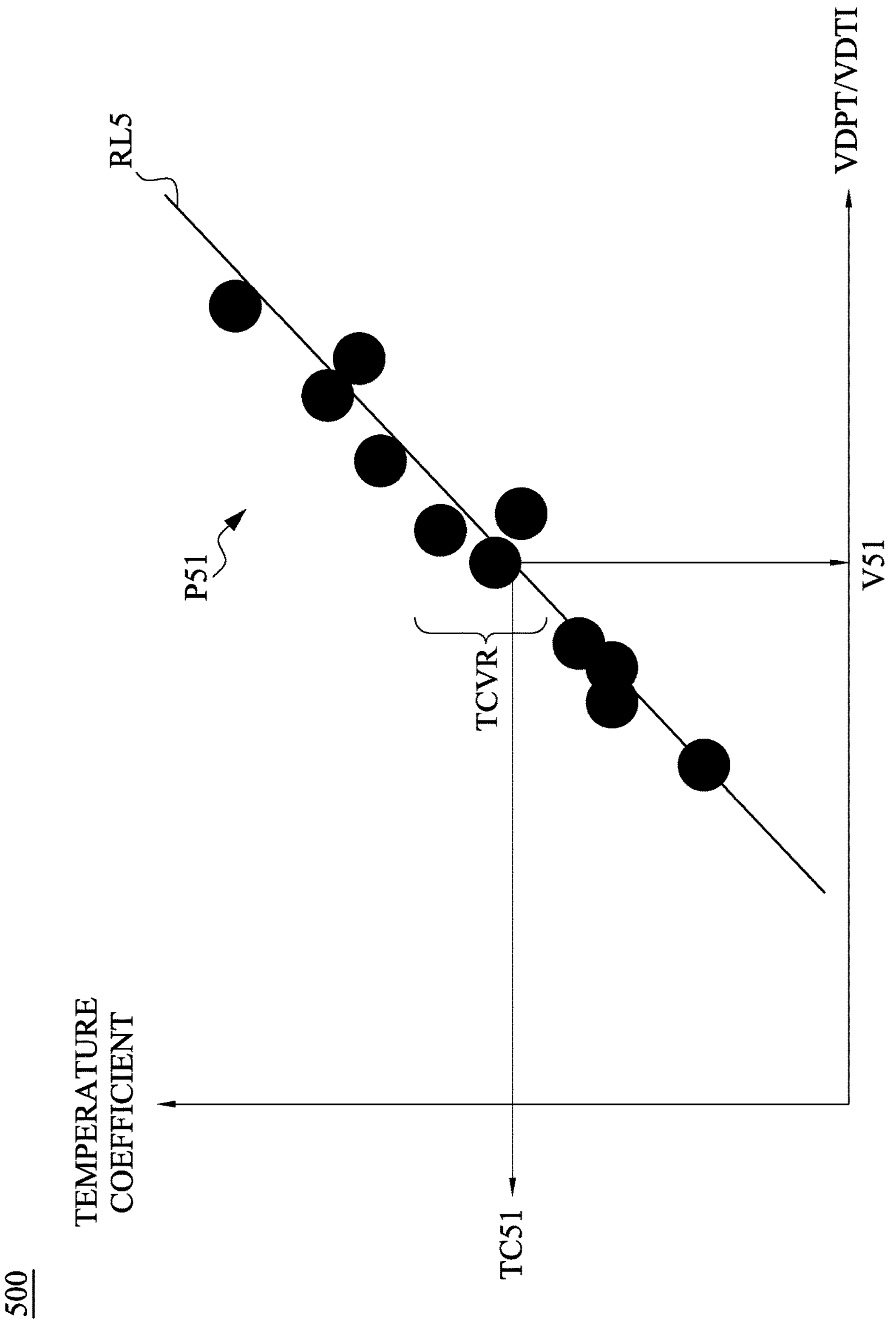
FIG. 5 is a schematic diagram of associated with temperature coefficients and the digital signals generated by the sensing device shown in FIG. 2A, in accordance with some embodiments of the present disclosure.

FIG. 5 is a schematic diagram 500 of associated with temperature coefficients and the digital signals generated by the sensing device 200 shown in FIG. 2A, in accordance with some embodiments of the present disclosure. A horizontal direction corresponds to a value VDPT divided by a value VDTI. A vertical direction corresponds to temperature coefficients of the value VDPT divided by the value VDTI (referred to as a value VDPT/VDTI hereafter). Referring to FIG. 2A, the value VDPT is the summation of the values of the digital signals DPT21 and DPT22, and the value VDTI is the summation of the values of the digital signals DTI21 and DTI22.

As illustratively shown in FIG. 5, the schematic diagram 500 includes a reference line RL5 and points P51. The reference line RL5 corresponds to a relationship between the value VDPT/VDTI and the temperature coefficient. The points P51 corresponds to actual measurements of different sensing devices 200 in different chips. In some embodiments, the reference line RL5 is obtained by previous measurement data.

Referring to FIG. 5 and FIG. 2A, the reference line RL5 is stored in the calculating circuit 240, such that the calculating circuit 240 is able to calculate the value of the temperature according to the temperature coefficient corresponding to the value VDPT/VDTI. For example, when the value VDPT/VDTI has a value V51, the calculating circuit 240 calculates the value of the temperature according to a temperature coefficient TC51 according to the reference line RL5 and the value V51.

In some embodiments, the points P51 have variations of the temperature coefficient corresponding to different chips. However, with the reference line RL5, the variations are reduced. For example, in response to the value V51, the temperature coefficient TC51 has the variation TCVR.

In some embodiments, the value V51 corresponds to a calibration temperature TCBR. In some embodiments, a 1-point calibration for the value VDPT/VDTI can be performed with the reference line RL5 under the calibration temperature TCBR. In some embodiments, the calibration temperature TCBR is room temperature. Accordingly, the cost is low. In some embodiments, a temperature error of a specific temperature TS5 is approximately equal to [(TCVR−TC51)/(TC51)]*(TS5−TCBR).

Figure 6:
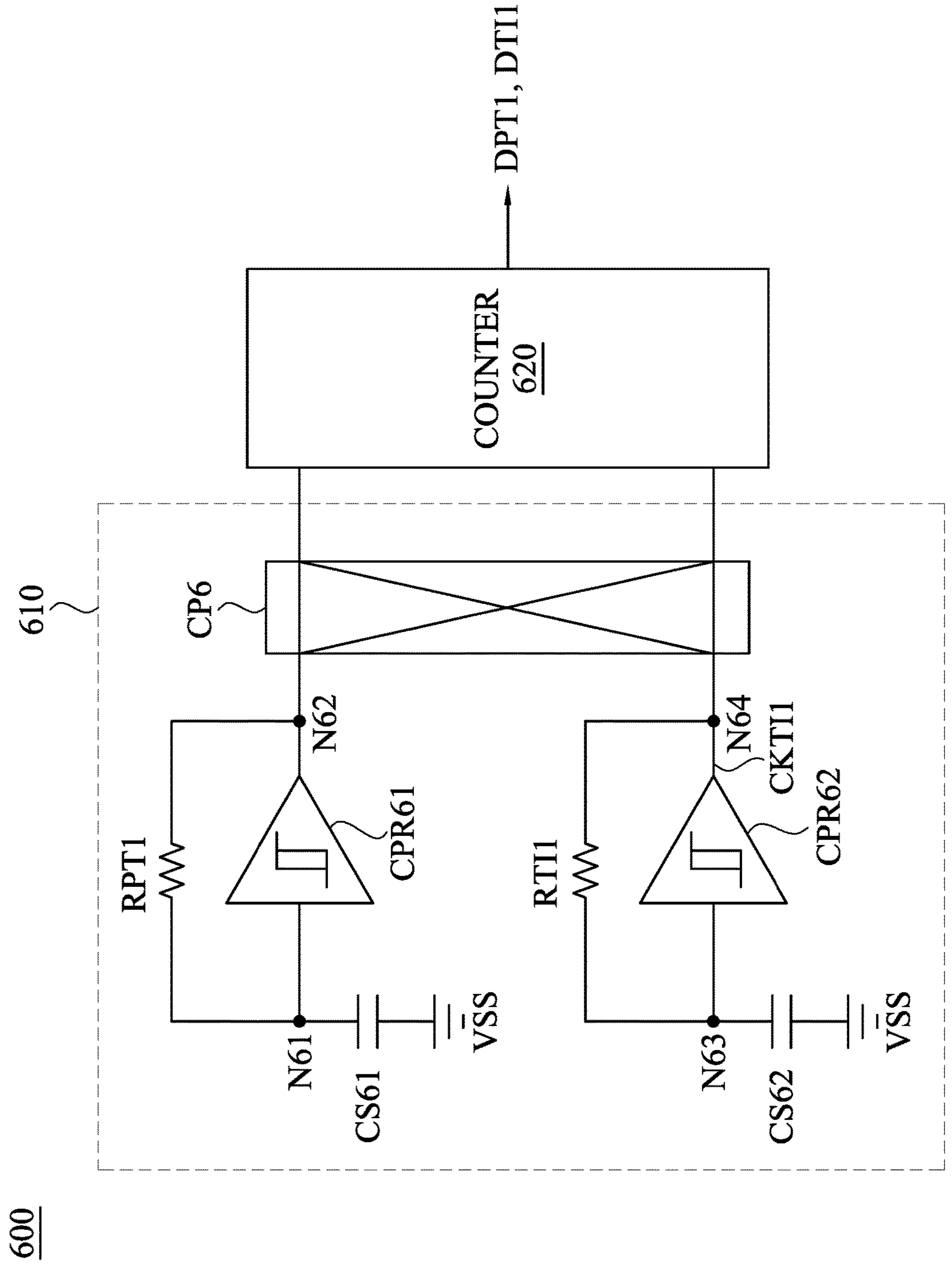
FIG. 6 is a schematic diagram of a sensing device, in accordance with some embodiments of the present disclosure.

FIG. 6 is a schematic diagram of a sensing device 600, in accordance with some embodiments of the present disclosure. Referring to FIG. 6 and FIG. 1A, the sensing device 600 is an alternative embodiment of the sensing device 100. FIG. 6 follows a similar labeling convention to that of FIG. 1A. For brevity, the discussion will focus more on differences between FIG. 6 and FIG. 1A than on similarities.

As illustratively shown in FIG. 6, the sensing device 600 includes a sensing circuit 610 and a counter 620. The sensing circuit 610 is configured to sense the temperature and generate the clock signals CKPT1 and CKTI1 according to the temperature. The counter 120 is configured to generate the digital signal DPT1 according to the clock signal CKPT1 and generate the digital signal DTI1 according to the clock signal CKTI1. A calculating circuit, such as the calculating circuit 240 shown in FIG. 2A, is configured to generate a value of the temperature according to the digital signals DPT1 and DTI1.

As illustratively shown in FIG. 6, the sensing circuit 610 includes comparators CPR61 and CPR62, the resistors RPT1, RTI1, capacitors CS61, CS62 and a chop circuit CP6. A terminal of the capacitor CS61 is configured to receive the reference voltage signal VSS, and another terminal of the capacitor CS61 is coupled to a node N61. A terminal of the capacitor CS62 is configured to receive the reference voltage signal VSS, and another terminal of the capacitor CS62 is coupled to a node N63. An input terminal of the comparator CPR61 is coupled to the node N61, and an output terminal of the comparator CPR61 is coupled to the node N62. An input terminal of the comparator CPR62 is coupled to the node N63, and an output terminal of the comparator CPR61 is coupled to the node N62. The resistor RPT1 is coupled between the nodes N61 and N62. The resistor RTI1 is coupled between the nodes N63 and N64.

In some embodiments, the comparator CPR61 is configured to generate the clock signal CKPT1 at the node N62 according to a capacitance of the capacitor CS61 and the resistance of the resistor RPT1. The comparator CPR62 is configured to generate the clock signal CKTI1 at the node N64 according to a capacitance of the capacitor CS62 and the resistance of the resistor RTI1. In some embodiments, the capacitance of the capacitor CS61 approximately equal to the capacitance of the capacitor CS62.

In some embodiments, the chop circuit CP6 is configured to transmit one of the clock signals CKPT1 and CKTI1 to the counter 620. For example, during a first phase of the sensing circuit 610, the chop circuit CP6 transmits the clock signal CKPT1 to the counter 620, such that the counter 620 generates the digital signal DPT1 according to the clock signal CKPT1. During a second phase of the sensing circuit 610, the chop circuit CP6 transmits the clock signal CKTI1 to the counter 620, such that the counter 620 generates the digital signal DTI1 according to the clock signal CKTI1.

In some embodiments, the chop circuit CP6 isolates the clock signal CKTI1 from the counter 620 during the first phase, and isolates the clock signal CKPT1 from the counter 620 during the second phase. In some embodiments, the first phase occurs before the second phase. In other embodiments, the first phase occurs after the second phase.

Figure 7:
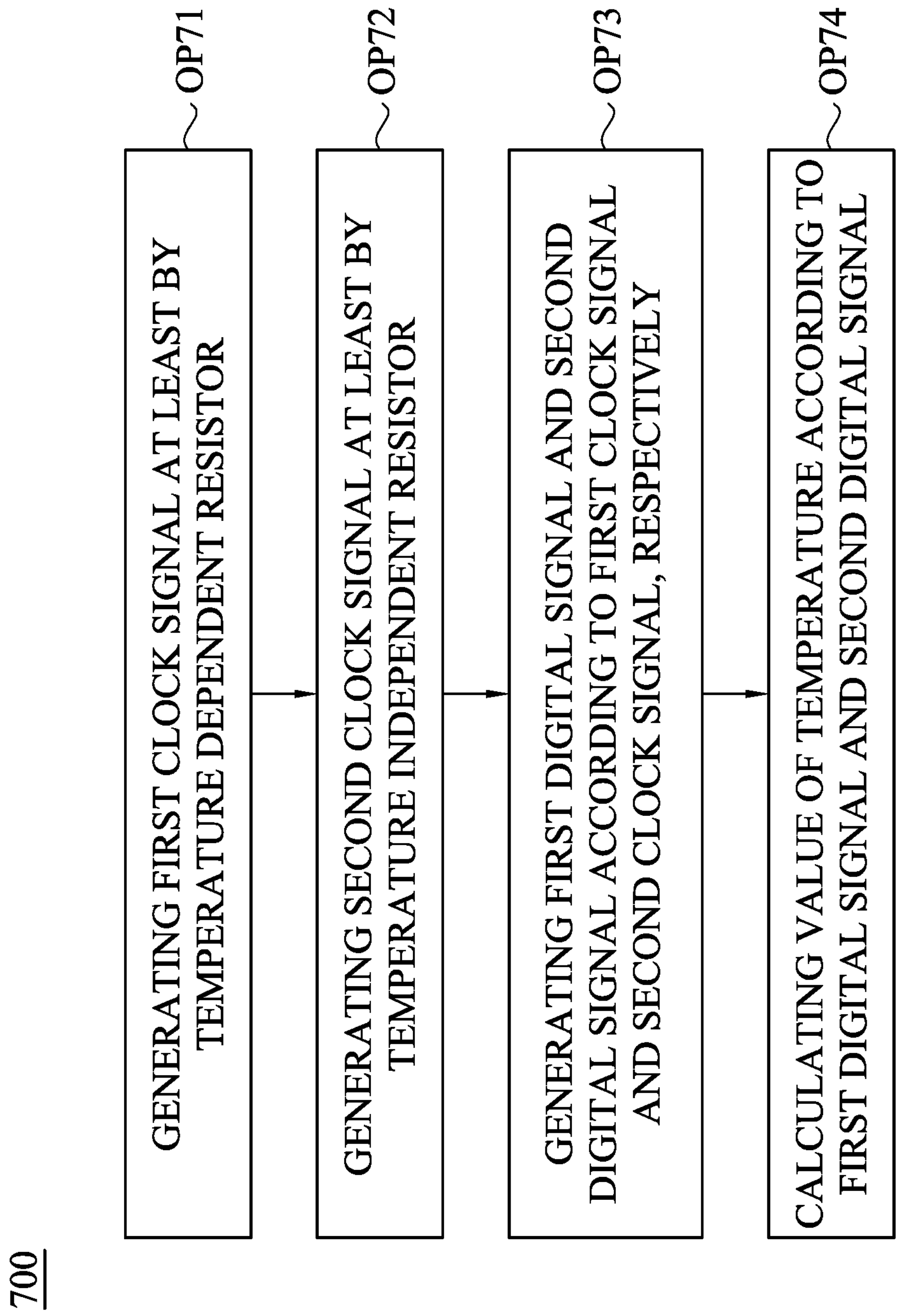
FIG. 7 is a flowchart diagram of a method operating at least one of the sensing devices shown in FIG. 1A, FIG. 2A and FIG. 6, in accordance with some embodiments of the present disclosure.

FIG. 7 is a flowchart diagram of a method 700 operating at least one of the sensing devices 100, 200 and 600 shown in FIG. 1A, FIG. 2A and FIG. 6, in accordance with some embodiments of the present disclosure. As illustratively shown in FIG. 7, the method 700 includes operations OP71-OP74.

During the operation OP71, a first clock signal is generated at least by a temperature dependent resistor. For example, the clock signal CKPT21 is generated by the temperature dependent resistor RPT1, the capacitor CS1 and the comparator CPR1 shown in FIG. 2A. For another example, the clock signal CKPT1 is generated by the temperature dependent resistor RPT1, the capacitor CS61 and the comparator CPR61 shown in FIG. 6.

During the operation OP72, a second clock signal is generated at least by a temperature independent resistor. For example, the clock signal CKTI21 is generated by the temperature dependent resistor RTI1, the capacitor CS1 and the comparator CPR1 shown in FIG. 2A. For another example, the clock signal CKTI1 is generated by the temperature dependent resistor RTI1, the capacitor CS62 and the comparator CPR62 shown in FIG. 6.

During the operation OP73, a first digital signal and a second digital signal are generated according to the first clock signal and the second clock signal, respectively. For example, the counter 220 generates the digital signals DPT21 and DTI21 according to the clock signals CKPT21 and CKTI21, respectively. For another example, the counter 620 generates the digital signals DPT1 and DTI1 according to the clock signals CKPT1 and CKTI1, respectively.

During the operation OP74, a value of a temperature is calculated according to the first digital signal and the second digital signal. For example, the value of the temperature is calculated at least according to the digital signals DPT21 and DTI21 by the calculating circuit 240. For another example, the value of the temperature is calculated according to the digital signals DPT1 and DTI1.

Figure 8:
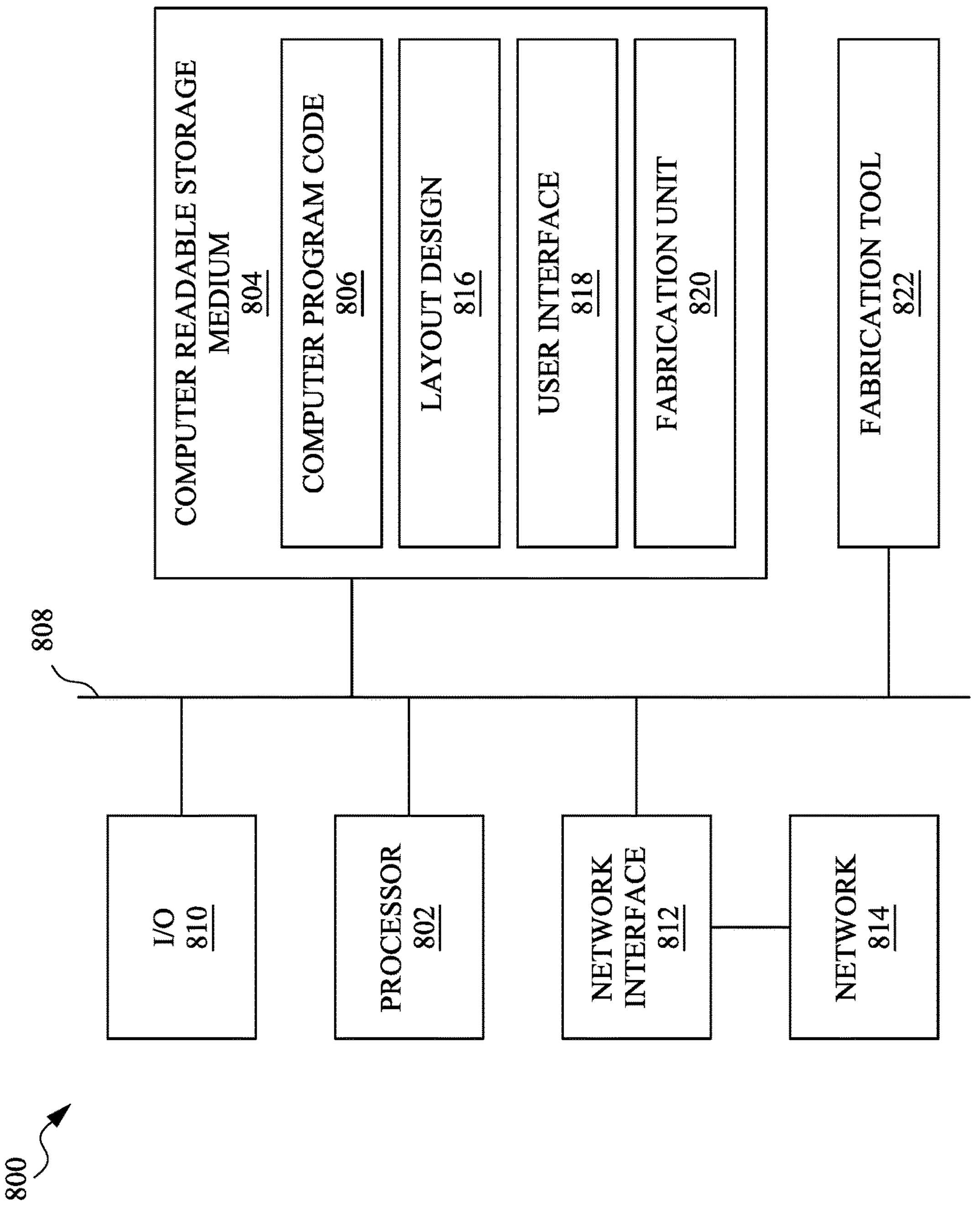
FIG. 8 is a schematic view of a system for designing and manufacturing of at least one of the sensing devices shown in FIG. 1A, FIG. 2A and FIG. 6, in accordance with some embodiments of the present disclosure.

FIG. 8 is a schematic view of a system 800 for designing and manufacturing of at least one of the sensing devices 100, 200 and 600 shown in FIG. 1A, FIG. 2A and FIG. 6, in accordance with some embodiments of the present disclosure. The system 800 generates or places one or more IC layout designs, as described herein. In some embodiments, the system 800 manufactures one or more semiconductor devices based on the one or more IC layout designs, as described herein. The system 800 includes a hardware processor 802 and a non-transitory, computer readable storage medium 804 encoded with, e.g., storing, the computer program code 806, e.g., a set of executable instructions. The computer readable storage medium 804 is configured for interfacing with manufacturing machines for producing the semiconductor device. The processor 802 is electrically coupled to the computer readable storage medium 804 by a bus 808. The processor 802 is also electrically coupled to an I/O interface 810 by the bus 808. A network interface 812 is also electrically connected to the processor 802 by the bus 808. Network interface 812 is connected to a network 814, so that the processor 802 and the computer readable storage medium 804 are capable of connecting to external elements via network 814. The processor 802 is configured to execute the computer program code 806 encoded in the computer readable storage medium 804 in order to cause the system 800 designing and manufacturing at least one of the sensing devices 100, 200 and 600.

In some embodiments, the processor 802 is a central processing unit (CPU), a multi-processor, a distributed processing system, an application specific integrated circuit (ASIC), and/or a suitable processing unit.

In some embodiments, the computer readable storage medium 804 is an electronic, magnetic, optical, electromagnetic, infrared, and/or a semiconductor system (or apparatus or device). For example, the computer readable storage medium 804 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 804 includes a compact disk-read only memory (CD-ROM), a compact disk-read/write (CD-R/W), and/or a digital video disc (DVD).

In some embodiments, the storage medium 804 also stores information needed for designing and manufacturing at least one of the sensing devices 100, 200 and 600, such as layout design 816, user interface 818, fabrication unit 820, and/or a set of executable instructions to perform the operation of designing and manufacturing at least one of the sensing devices 100, 200 and 600.

In some embodiments, the storage medium 804 stores instructions (e.g., the computer program code 806) for interfacing with manufacturing machines. The instructions (e.g., the computer program code 806) enable the processor 802 to generate manufacturing instructions readable by the manufacturing machines to effectively implement the designing and manufacturing at least one of the sensing devices 100, 200 and 600 during a manufacturing process.

The system 800 includes the I/O interface 810. The I/O interface 810 is coupled to external circuitry. In some embodiments, the I/O interface 810 includes a keyboard, keypad, mouse, trackball, trackpad, and/or cursor direction keys for communicating information and commands to the processor 802.

The system 800 also includes the network interface 812 coupled to the processor 802. The network interface 812 allows the system 800 to communicate with the network 814, to which one or more other computer systems are connected. The network interface 812 includes wireless network interfaces such as BLUETOOTH, WIFI, WIMAX, GPRS, or WCDMA; or wired network interface such as ETHERNET, USB, or IEEE-13154. In some embodiments, the designing and manufacturing at least one of the sensing devices 100, 200 and 600 is implemented in two or more systems 800, and information such as layout design, user interface and fabrication unit are exchanged between different systems 800 by the network 814.

The system 800 is configured to receive information related to a layout design through the I/O interface 810 or network interface 812. The information is transferred to the processor 802 by the bus 808 to determine a layout design for producing an IC. The layout design is then stored in the computer readable medium 804 as the layout design 816. The system 800 is configured to receive information related to a user interface through the I/O interface 810 or network interface 812. The information is stored in the computer readable medium 804 as the user interface 818. The system 800 is configured to receive information related to a fabrication unit through the I/O interface 810 or network interface 812. The information is stored in the computer readable medium 804 as the fabrication unit 820. In some embodiments, the fabrication unit 820 includes fabrication information utilized by the system 800.

In some embodiments, the designing and manufacturing at least one of the sensing devices 100, 200 and 600 is implemented as a standalone software application for execution by a processor. In some embodiments, the designing and manufacturing at least one of the sensing devices 100, 200 and 600 is implemented as a software application that is a part of an additional software application. In some embodiments, the designing and manufacturing at least one of the sensing devices 100, 200 and 600 is implemented as a plug-in to a software application. In some embodiments, the designing and manufacturing at least one of the sensing devices 100, 200 and 600 is implemented as a software application that is a portion of an EDA tool. In some embodiments, the designing and manufacturing at least one of the sensing devices 100, 200 and 600 is implemented as a software application that is used by an EDA tool. In some embodiments, the EDA tool is used to generate a layout design of the integrated circuit device. In some embodiments, the layout design is stored on a non-transitory computer readable medium. In some embodiments, the layout design is generated using a tool such as VIRTUOSO® available from CADENCE DESIGN SYSTEMS, Inc., or another suitable layout generating tool. In some embodiments, the layout design is generated based on a netlist which is created based on the schematic design. In some embodiments, the designing and manufacturing at least one of the sensing devices 100, 200 and 600 is implemented by a manufacturing device to manufacture an integrated circuit using a set of masks manufactured based on one or more layout designs generated by the system 800. In some embodiments, the system 800 includes a manufacturing device (e.g., fabrication tool 822) to manufacture an integrated circuit using a set of masks manufactured based on one or more layout designs of the present disclosure.

Figure 9:
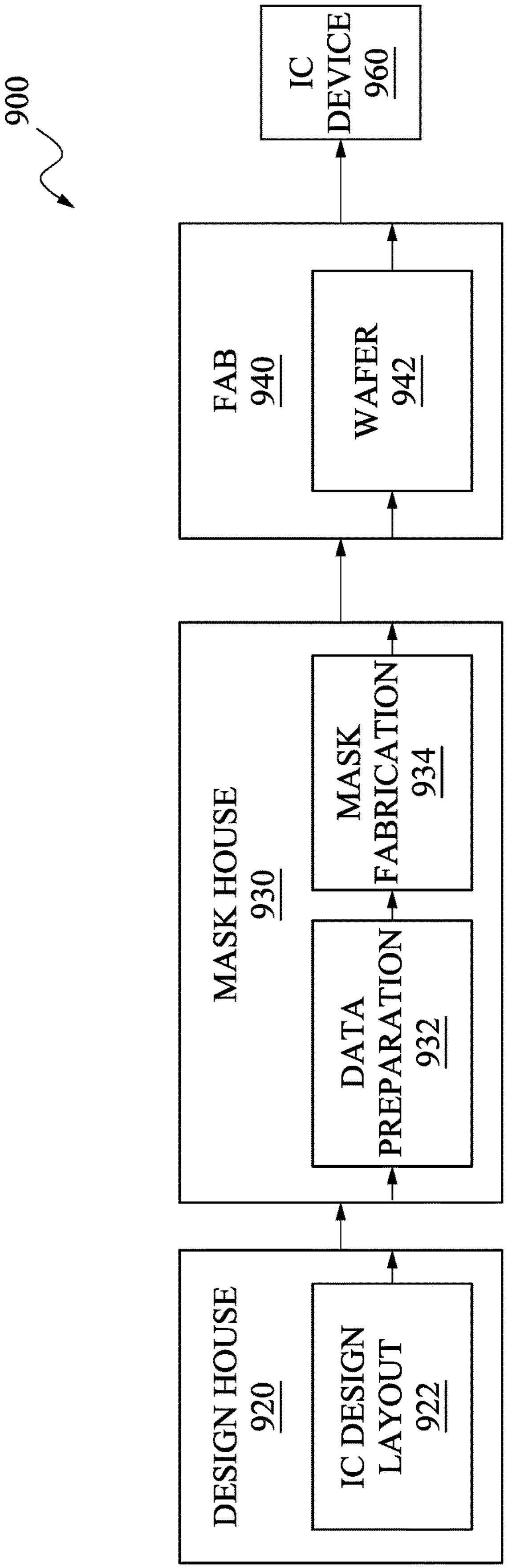
FIG. 9 is a block diagram of an integrated circuit (IC)/semiconductor device manufacturing system, and an IC manufacturing flow associated therewith, in accordance with some embodiments of the present disclosure.

FIG. 9 is a block diagram of an integrated circuit (IC)/semiconductor device manufacturing system 900, and an IC manufacturing flow associated therewith, in accordance with some embodiments of the present disclosure.

In FIG. 9, the IC manufacturing system 900 includes entities, such as a design house 920, a mask house 930, and an IC manufacturer/fabricator ("fab") 940, that interact with one another in the design, development, and manufacturing cycles and/or services related to manufacturing an IC device (semiconductor device) 960 including at least one of the sensing devices 100, 200 and 600. The entities in system 900 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 920, mask house 930, and IC fab 940 is owned by a single company. In some embodiments, two or more of design house 920, mask house 930, and IC fab 940 coexist in a common facility and use common resources.

The design house (or design team) 920 generates an IC design layout 922. The IC design layout 922 includes various geometrical patterns designed for the IC device 960. The geometrical patterns correspond to patterns of metal, oxide, or semiconductor layers that make up the various components of the IC device 960 to be fabricated. The various layers combine to form various IC features. For example, a portion of the IC design layout 922 includes various IC features, such as an active region, gate structures, source/drain structures, interconnect structures, and openings for bonding pads, to be formed in a semiconductor substrate (such as a silicon wafer) and various material layers disposed on the semiconductor substrate. The design house 920 implements a proper design procedure to form the IC design layout 922. The design procedure includes one or more of logic design, physical design or place and route. The IC design layout 922 is presented in one or more data files having information of the geometrical patterns. For example, the IC design layout 922 can be expressed in a GDSII file format or DFII file format.

The mask house 930 includes mask data preparation 932 and mask fabrication 934. The mask house 930 uses the IC design layout 922 to manufacture one or more masks to be used for fabricating the various layers of the IC device 960 according to the IC design layout 922. The mask house 930 performs the mask data preparation 932, where the IC design layout 922 is translated into a representative data file ("RDF"). The mask data preparation 932 provides the RDF to the mask fabrication 934. The mask fabrication 934 includes a mask writer. A mask writer converts the RDF to an image on a substrate, such as a mask (reticle) or a semiconductor wafer, or a metal layer which is formed and thereafter selectively etched to form a redistribution layer at a back end of line process of the fab. The design layout is manipulated by the mask data preparation 932 to comply with particular characteristics of the mask writer and/or requirements of the IC fab 940. In FIG. 9, the mask data preparation 932 and mask fabrication 934 are illustrated as separate elements. In some embodiments, the mask data preparation 932 and mask fabrication 934 can be collectively referred to as mask data preparation.

In some embodiments, the mask data preparation 932 includes optical proximity correction (OPC) which uses lithography enhancement techniques to compensate for image errors, such as those that can arise from diffraction, interference, other process effects and the like. OPC adjusts the IC design layout 922. In some embodiments, the mask data preparation 932 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, the mask data preparation 932 includes a mask rule checker (MRC) that checks the IC design layout that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout to compensate for limitations during the mask fabrication 934, which may undo part of the modifications performed by OPC in order to meet mask creation rules.

In some embodiments, the mask data preparation 932 includes lithography process checking (LPC) that simulates processing that will be implemented by the IC fab 940 to fabricate the IC device 960. LPC simulates this processing based on the IC design layout 922 to create a simulated manufactured device, such as the IC device 960. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC can be repeated to further refine the IC design layout 922.

It should be understood that the above description of the mask data preparation 932 has been simplified for the purposes of clarity. In some embodiments, the mask data preparation 932 includes additional features such as a logic operation (LOP) to modify the IC design layout according to manufacturing rules. Additionally, the processes applied to the IC design layout 922 during the mask data preparation 932 may be executed in a variety of different orders.

After the mask data preparation 932 and during mask fabrication 934, a mask or a group of masks are fabricated based on the modified IC design layout. In some embodiments, an electron-beam (e-beam) or a mechanism of multiple e-beams is used to form a pattern on a mask (photomask or reticle) based on the modified IC design layout. The mask can be formed in various technologies. In some embodiments, the mask is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask includes a transparent substrate (e.g., fused quartz) and an opaque material (e.g., chromium) coated in the opaque regions of the mask. In another example, the mask is formed using a phase shift technology. In the phase shift mask (PSM), various features in the pattern formed on the mask are configured to have proper phase difference to enhance the resolution and imaging quality. In various examples, the phase shift mask can be attenuated PSM or alternating PSM. The mask(s) generated by the mask fabrication 934 is used in a variety of processes. For example, such a mask(s) is used in an ion implantation process to form various doped regions in the semiconductor wafer, in an etching process to form various etching regions in the semiconductor wafer, and/or in other suitable processes.

The IC fab 940 is an IC fabrication entity that includes one or more manufacturing facilities for the fabrication of a variety of different IC products. In some embodiments, the IC fab 940 is a semiconductor foundry. For example, there may be a first manufacturing facility for the front end fabrication of a plurality of IC products (e.g., source/drain structures, gate structures), while a second manufacturing facility may provide the middle end fabrication for the interconnection of the IC products (e.g., MDs, VDs, VGs) and a third manufacturing facility may provide the back end fabrication for the interconnection and packaging of the IC products (e.g., M0 tracks, M1 tracks, BM0 tracks, BM1 tracks), and a fourth manufacturing facility may provide other services for the foundry entity.

The IC fab 940 uses the mask (or masks) fabricated by the mask house 930 to fabricate the IC device 960. Thus, the IC fab 940 at least indirectly uses the IC design layout 922 to fabricate the IC device 960. In some embodiments, a semiconductor wafer is fabricated by the IC fab 940 using the mask (or masks) to form the IC device 960. The semiconductor wafer 942 includes a silicon substrate or other proper substrate having material layers formed thereon. Semiconductor wafer further includes one or more of various doped regions, dielectric features, multilevel interconnects, and the like (formed at subsequent manufacturing steps).

Also disclosed is a device. The device includes a first resistor, a first switch, a second switch, a comparator and a counter. The first resistor is configured to sense a temperature. The first switch is coupled in series with the first resistor between a first node and a second node. The second switch is coupled in parallel with the first switch. The comparator is coupled between the first node and the second node, and is configured to generate a first clock signal when the first switch is turned on, and is configured to generate a second clock signal when the second switch is turned on. The counter is configured to generate a first digital signal according to the first clock signal, and is configured to generate a second digital signal according to the second clock signal. A value of the temperature is calculated at least according to the first digital signal and the second digital signal.

Also disclosed is a device. The device includes a comparator, a first switch, a second switch and a first chop circuit. The comparator is configured to generate a first clock signal, a second clock signal and a third clock signal. The first switch is configured to couple a temperature dependent resistor to a first node when the comparator generates the first clock signal and the second clock signal. The second switch is configured to couple a temperature independent resistor to the first node when the comparator generates the third clock signal. The first chop circuit is configured to couple the first node to a first input terminal of the comparator when the comparator generates the first clock signal and the third clock signal, and couple the first node to a second input terminal of the comparator when the comparator generates the second clock signal. The first input terminal is different from the second input terminal.

Also disclosed is a method. The method includes: generating a first clock signal at least by a temperature dependent resistor; generating a second clock signal at least by a temperature independent resistor; generating a first digital signal and a second digital signal according to the first clock signal and the second clock signal, respectively; and calculating a value of a temperature according to the first digital signal and the second digital signal.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A device, comprising:

a first resistor configured to sense a temperature;

a first switch coupled in series with the first resistor between a first node and a second node;

a second switch coupled in parallel with the first switch;

a comparator coupled between the first node and the second node, configured to generate a first clock signal when the first switch is turned on, and configured to generate a second clock signal when the second switch is turned on; and a counter configured to generate a first digital signal according to the first clock signal, and configured to generate a second digital signal according to the second clock signal, wherein a value of the temperature is calculated at least according to the first digital signal and the second digital signal.

2. The device of claim 1, further comprising:

a second resistor independent from the temperature and coupled in series with the second switch between the first node and the second node; and a capacitor coupled to the first node, wherein each of the capacitor, the first resistor and the second resistor is disposed directly above a function circuit along a direction, and the second resistor is disposed between a portion of the capacitor and the first resistor along the direction.

3. The device of claim 1, further comprising:

a first chop circuit configured to couple the first node to a first input terminal of the comparator in response to a first control signal having a first voltage level, and configured to couple the first node to a second input terminal of the comparator in response to the first control signal having a second voltage level, wherein the first voltage level is different from the second voltage level, and the first input terminal is different from the second input terminal.

4. The device of claim 3, further comprising:

a voltage divider configured to generate a first voltage signal at a third node at least according to the first clock signal and the second clock signal, wherein the first chop circuit is further configured to couple the third node to the second input terminal in response to the first control signal having the first voltage level, and configured to couple the third node to the first input terminal of the comparator in response to the first control signal having the second voltage level.

5. The device of claim 4, wherein the voltage divider comprises:

a third switch controlled at least by the first clock signal and the second clock signal, and configured to provide a first reference voltage signal to the third node; and a fourth switch configured to provide a second reference voltage signal to the third node, wherein the first reference voltage signal is different from the second reference voltage signal, and the fourth switch is turned off when the third switch is turned on.

6. The device of claim 3, further comprising:

a second chop circuit configured to couple the second node to a first output terminal of the comparator in response to the first control signal having the first voltage level, and configured to couple the second node to a second output terminal of the comparator in response to the first control signal having the second voltage level, wherein the first output terminal is different from the second output terminal.

7. The device of claim 6, wherein the second chop circuit is further configured to generate a first voltage signal to bias the comparator.

8. The device of claim 7, wherein the comparator comprises:

a third switch and a fourth switch coupled to each other at the second output terminal, wherein each of a control terminal of the third switch and a control terminal of the fourth switch is coupled to the second input terminal.

9. The device of claim 8, wherein the comparator further comprises:

a fifth switch and a sixth switch coupled to the third switch and the fourth switch, respectively, wherein each of a control terminal of the fifth switch and a control terminal of the sixth switch is configured to receive the first voltage signal.

10. The device of claim 8, wherein the comparator further comprises:

a fifth switch and a sixth switch coupled to the third switch and the fourth switch, respectively, wherein each of a control terminal of the fifth switch and a control terminal of the sixth switch is coupled to the first input terminal, and the fifth switch and the sixth switch are coupled to each other at the first output terminal.

11. The device of claim 3, wherein when the first control signal has the first voltage level and the first switch is turned on, the comparator generates the first clock signal, when the first control signal has the first voltage level and the second switch is turned on, the comparator generates the second clock signal, when the first control signal has the second voltage level and the first switch is turned on, the comparator generates a third clock signal, when the first control signal has the second voltage level and the second switch is turned on, the comparator generates a fourth clock signal, the value of the temperature is calculated according to the first clock signal, the second clock signal, the third clock signal and the fourth clock signal.

12. A device, comprising:

a comparator configured to generate a first clock signal, a second clock signal and a third clock signal;

a first switch configured to couple a temperature dependent resistor to a first node when the comparator generates the first clock signal and the second clock signal;

a second switch configured to couple a temperature independent resistor to the first node when the comparator generates the third clock signal; and a first chop circuit configured to couple the first node to a first input terminal of the comparator when the comparator generates the first clock signal and the third clock signal, and couple the first node to a second input terminal of the comparator when the comparator generates the second clock signal, wherein the first input terminal is different from the second input terminal.

13. The device of claim 12, wherein the comparator is further configured to generate a fourth clock signal, the second switch is further configured to couple the temperature independent resistor to the first node when the comparator generates the fourth clock signal, and the first chop circuit is further configured to couple the first node to the second input terminal when the comparator generates the fourth clock signal.

14. The device of claim 12, further comprising:

a second chop circuit configured to couple a first output terminal of the comparator to a second node when the comparator generates the first clock signal, and configured to couple a second output terminal of the comparator to the second node when the comparator generates the second clock signal, wherein the first output terminal is different from the second output terminal.

15. The device of claim 14, further comprising:

a first buffer coupled between the second node and the temperature dependent resistor; and a second buffer coupled between the second node and the temperature independent resistor.

16. The device of claim 12, further comprising:

a first resistor coupled to a second node and configured to receive a reference voltage signal; and a third switch coupled between the second node and the first chop circuit, and configured to receive the first clock signal, the second clock signal and the third clock signal.

17. The device of claim 16, wherein the comparator comprises:

a fourth switch configured to receive the reference voltage signal; and a fifth switch coupled to the fourth switch, a control terminal of the fifth switch being coupled to the second input terminal.

18. A method, comprising:

generating a first clock signal at least by a temperature dependent resistor;

generating a second clock signal at least by a temperature independent resistor;

generating a first digital signal and a second digital signal according to the first clock signal and the second clock signal, respectively; and calculating a value of a temperature according to the first digital signal and the second digital signal.

19. The method of claim 18, further comprising:

transmitting the first clock signal to a counter generating the first digital signal and the second digital signal when the second clock signal is isolated from the counter; and transmitting the second clock signal to the counter when the first clock signal is isolated from the counter.

20. The method of claim 18, further comprising:

coupling the temperature dependent resistor to a capacitor to generate the first clock signal; and coupling the temperature independent resistor to the capacitor to generate the second clock signal.

* * * * *